June 10, 1924.

G. M. EATON ET AL 1,497,433

ELECTRICAL SYSTEM

Filed Oct. 11, 1919    3 Sheets-Sheet 1

WITNESSES:
Geo. D. Barrett
P. J. Fitzgerald

INVENTORS
George M. Eaton.
Howard H. Johnston.
BY
Wesley G. Carr
ATTORNEY

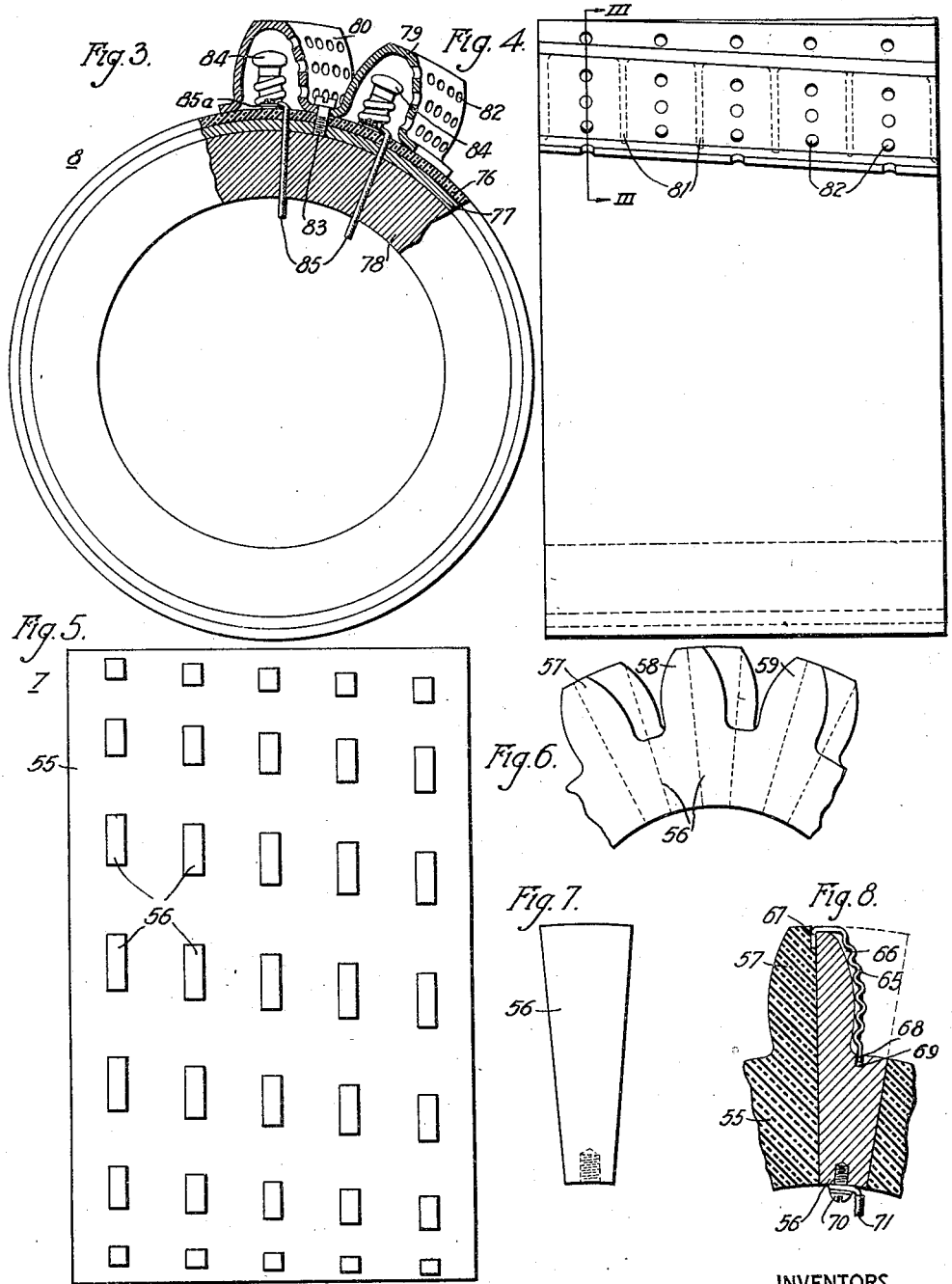

June 10, 1924.
G. M. EATON ET AL
1,497,433
ELECTRICAL SYSTEM
Filed Oct. 11, 1919   3 Sheets-Sheet 3
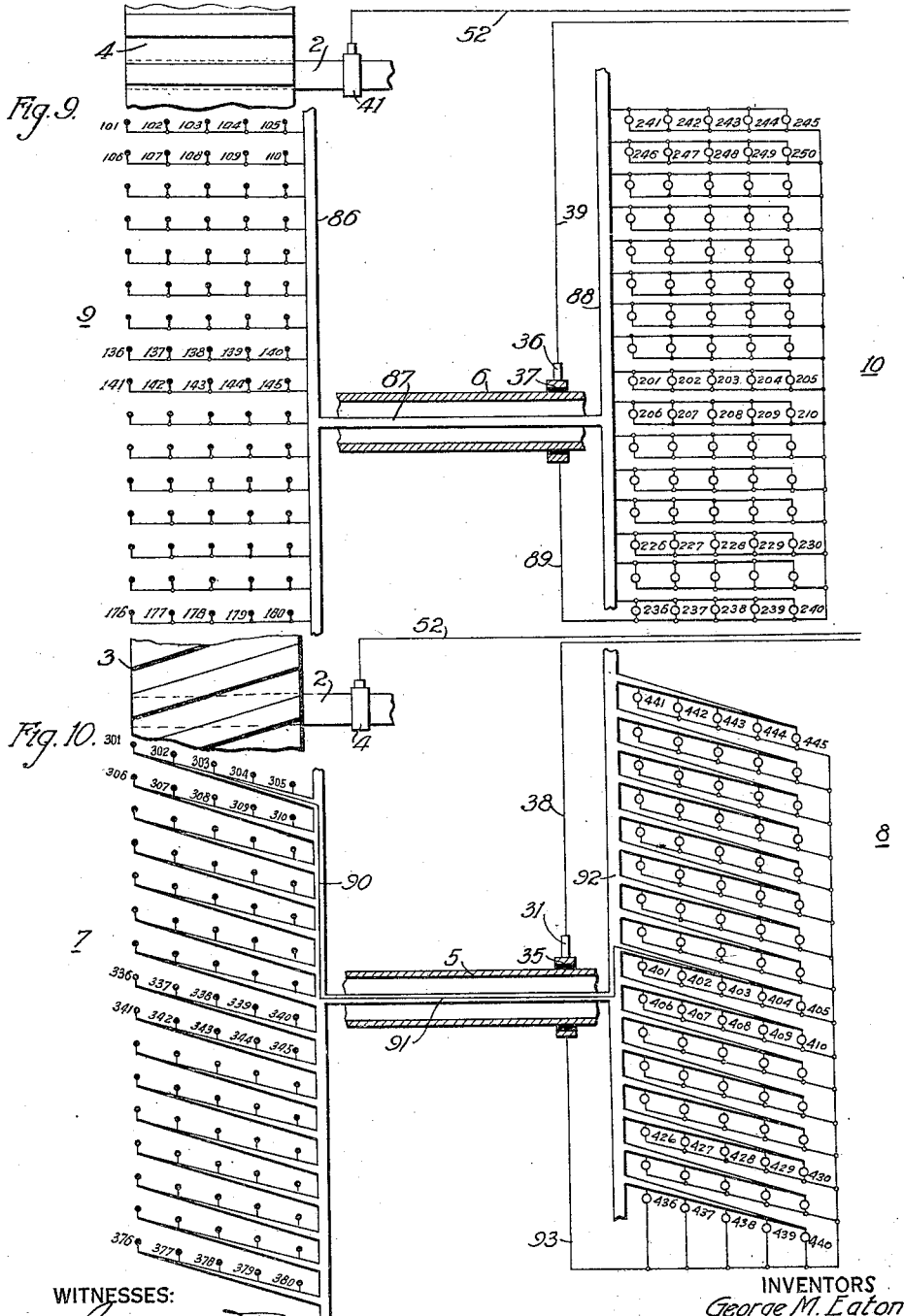
WITNESSES:
INVENTORS
George M. Eaton &
Howard H. Johnston.
BY
ATTORNEY Patented June 10, 1924.

1,497,433

UNITED STATES PATENT OFFICE.

GEORGE M. EATON, OF PITTSBURGH, AND HOWARD H. JOHNSTON, OF EDGEWOOD PARK, PENNSYLVANIA, ASSIGNORS TO WESTINGHOUSE ELECTRIC & MANUFACTURING COMPANY, A CORPORATION OF PENNSYLVANIA.

ELECTRICAL SYSTEM.

Application filed October 11, 1919. Serial No. 330,142.

*To all whom it may concern:*

Be it known that we, GEORGE M. EATON, a citizen of the United States, and a resident of Pittsburgh, in the county of Allegheny and State of Pennsylvania, and HOWARD H. JOHNSTON, a citizen of the United States, and a resident of Edgewood Park, in the county of Allegheny and State of Pennsylvania, have invented a new and useful Improvement in Electrical Systems, of which the following is a specification.

Our invention relates to electrical systems, and it has special relation to systems employed in the demonstration of tooth contact in meshing gear-wheels.

As is well known to those skilled in the art, the use of helical, rather than spur, gears and pinions produces smoother and more silent operation, thereby tending toward greater efficiency and life of the mechanically-connected apparatus. These advantages are especially valuable in the case of railway vehicles, which are unavoidably subjected to great vibration and severe usage.

One object of our present invention, therefore, is to visually demonstrate the smoothness and continuity of tooth contact in the case of meshing helical gear-wheels compared to meshing spur gear-wheels.

More specifically stated, it is an object of our invention to provide a demonstrating or indicating pinion rotatable with the meshing gear and pinion and provided with hollow teeth within which a plurality of signal means, such as electric lights, are located to successively and visually indicate the contemporaneous contacts of the corresponding teeth in the meshing gear-wheels.

Another object of our invention is to provide signal means of the above-indicated character for indicating the relative types of tooth contacts in helical and spur gearing in a compact and convenient demonstrating apparatus.

A further object of our invention is to provide indicating means remote from the meshing gear-wheels for indicating the time required by a gear tooth in making a complete contact, that is, for indicating the tooth-meshing period.

Figure 1:
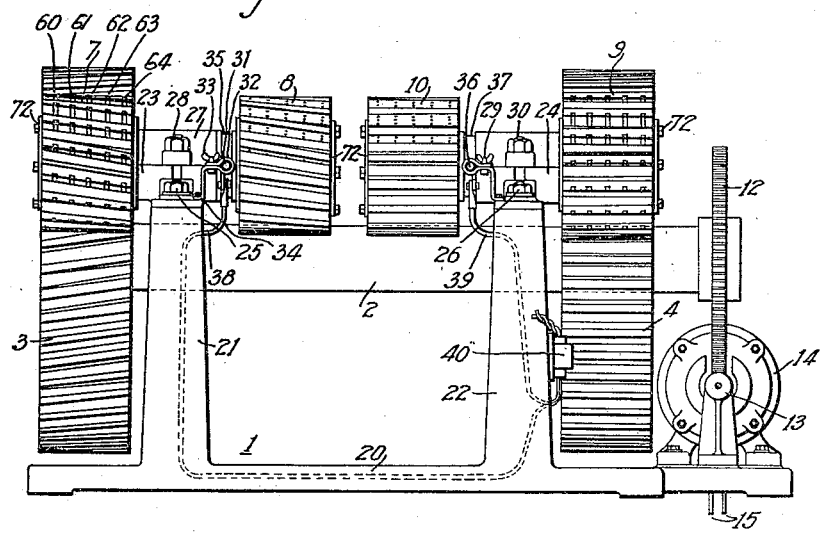
Figure 2:
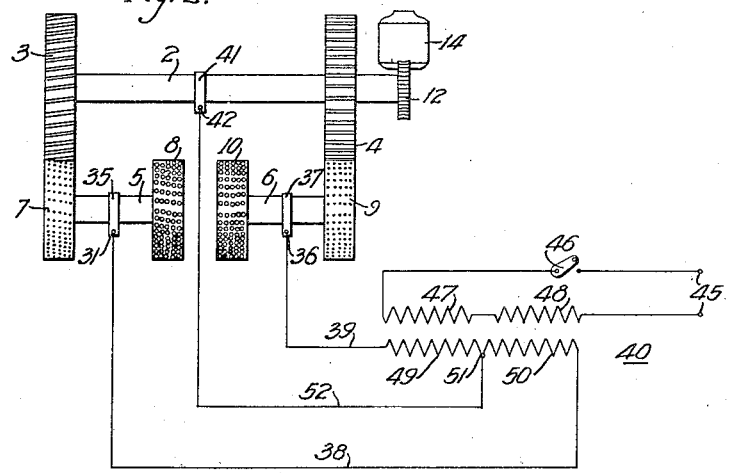

Other objects of our invention will become evident from the following detailed description, taken in conjunction with the accompanying drawings, wherein Figure 1 is a view, in elevation, of a complete demonstrating apparatus assembled and organized in accordance with our present invention;

Fig. 2 is a diagrammatic plan view of the apparatus, showing the general electrical connections;

Fig. 3 to Fig. 8, inclusive, are views of various members of the demonstrating apparatus either in intermediate or in final manufactured form, the partial section in Fig. 3 being taken along the line III—III of Fig. 4; and Fig. 9 and Fig. 10 are diagrammatic views serving to illustrate the electrical connections within the apparatus for the purpose of successively indicating the tooth contacts of the meshing gear-wheels.

Referring to Fig. 1 and Fig. 2 of the drawings, the apparatus here shown comprises a bed-plate or demonstrating stand 1 for supporting a hollow gear shaft 2, near the opposite ends of which a helical gear-wheel 3 and a spur gear-wheel 4 are respectively keyed or otherwise secured, and for also supporting a plurality of hollow pinion shafts 5 and 6 (best shown in Fig. 2) to which are respectively rigidly secured a contact or meshing pinion 7 of the helical type and a corresponding demonstrating or indicating pinion 8, and a contact or meshing pinion 9 of the spur type, together with a similar demonstrating or indicating pinion 10.

The several shafts are made hollow not only for the sake of decreasing the weight, but also to enclose and conceal a number of wires or conductors, in the case of the pinion shafts 5 and 6, as hereinafter more fully set forth.

For the purpose of driving the gear shaft 2, a worm gear-wheel 12 is rigidly secured to one end thereof outside of the meshing gear-wheels 4 and 9, the worm gear-wheel being driven from a suitable worm 13 that is rotated by an electric motor 14, for which suitable supply leads 15 are provided. It will be understood, however, that any other form of drive may be employed, if desired.

The bed-plate or demonstrating stand 1 may be of any convenient form and is here shown as comprising a base 20 that extends beneath and beyond the entire set of gear-wheels and also acts as a mounting base for the electric motor 14. The bed-plate further comprises a plurality of standards or uprights 21 and 22 for the general purpose of supporting the various operating shafts 2, 5 and 6. A lower cap or bearing member 23 for the shaft 5 is secured by a plurality of bolts 25 to the standard 21, while an upper cap or bearing member 27 is attached to the lower cap 23 by means of a plurality of bolts 28. A similar structure is provided for the other pinion shaft 6, comprising a lower cap 24 that is secured by bolts 26 to the standard 22 and an upper cap 29 that is fastened to the lower cap 24 through the agency of bolts 30.

The four pinions 7, 8, 10 and 9 are thus rotatively supported in alinement upon the standards 21 and 22. It will be understood, without detailed description, that the gear shaft 2 is similarly supported upon the standards 21 and 22 to provide proper meshing between the helical gear-wheels 3 and 7 and the spur gear-wheels 4 and 9.

It will be seen that the present apparatus thus provides, in a compact and convenient structure, the possibility of demonstrating, side-by-side, the operations of helical and of spur gearing. For affording the actual visual demonstration of such tooth contact, the demonstrating or indicating pinions 8 and 10 are provided with signal means, such as electric lights, as more fully described hereinafter.

To conduct current from an external source to the lights in the demonstrating pinions, the following apparatus is provided. A carbon pencil or brush 31 is insulatedly secured within a metallic contact clip 32, being rigidly positioned, through the agency of a wing-nut 33, the clip or support 32 being secured to the standard 21 by means of a bolt 34. The carbon pencil or brush 31 is adapted to bear upon an insulated contact or collector ring 35, as diagrammatically illustrated in Fig. 2. In this way, current is conducted to the circuits comprised within the demonstrating helical pinion 8.

A similar arrangement is provided for the spur-gear portion of the apparatus, comprising a carbon pencil or brush 36 and a collector ring 37, the brush being insulatedly supported upon the standard 22, as already described in connection with the other carbon brush 31.

Suitable conductors or insulated wires 38 and 39 are secured to the carbon pencils 31 and 36, respectively, and extend to a set 40 of small transformers which are adapted to reduce the voltage of the ordinary lighting circuit to a relatively low electromotive force, such as 4 volts, for supplying energy to the various signal lamps in the demonstrating pinions 8 and 10.

The set 40 of transformers is diagrammatically shown in Fig. 2, wherein is also illustrated a collector ring 41 and a carbon pencil or brush 42, which are associated with the gear shaft 2 to conduct current thereto in order to complete the circuit of the signal lamps, as hereinafter described in detail. As previously mentioned, the carbon brushes 31 and 36 for the demonstrating pinions 8 and 10, respectively, are insulated from the bed-plate 1, as are also the corresponding collector rings 35 and 37. However, since the gear-wheels 3 and 4 are employed to form a portion of the electrical circuits, the collector ring 41 is electrically secured to the gear shaft 2. In other words, the low voltage of the lighting circuits enables the bed-plate 1 or any other portion of the apparatus that is not insulated therefrom to be safely employed as one terminal of the lighting circuit, but more reliable operation may be secured by directly connecting the external circuit to the carbon brush 42 and the collector ring 41, as indicated in Fig. 2.

Referring to the electrical circuits in Fig. 2, a suitable source 45 of single-phase alternating-current energy, such as the usual 110-volt lighting circuit, is adapted to transmit energy through a switch 46, when occupying its closed position, and a plurality of series-connected primary transformer coils 47 and 48. A secondary transformer coil is divided into two sections 49 and 50 which have a common tap or junction-point 51. This tap is connected through conductor 52 to the collector ring 41 on the gear shaft 2, while the outer terminals of the transformer sections 49 and 50 are joined through conductors 39 and 38, respectively, to the collector rings 37 and 35 that are associated with the demonstrating pinions 10 and 8.

Fig. 5 shows the annular blank 55 for the helical contact pinion 7. This pinion may be made of fabric or other insulating material, such as rawhide, and a plurality of wedge-shaped brass plugs or inserts 56 are inserted in the blank in the proper relation with respect to the formation of the desired helical gear teeth, the inserts 56 extending from the outer to the inner surface of the annular blank 55, as indicated in Fig. 6 and Fig. 8.

After the gear blank has been prepared, as shown in Fig. 5, the helical teeth 57, 58, 59, etc. are cut in the usual manner, whereby a plurality of conducting or contact strips 60 to 64, inclusive, (shown in Fig. 1) are spaced across the contacting face of each tooth of the helical pinion 7. The sectional view of a gear tooth is shown in Fig. 8, wherein the preferred contacting device is also shown as comprising a serrated or corrugated wire 65 having the desired resiliency, which rests within and protrudes beyond a groove or recess 66 in the face of the brass insert 56. The upper end 67 of the wire 65 is hooked or clinched over the upper end of the insert, making permanent contact therewith, while the lower end 68 of the wire 65 reposes in the drilled opening 69 of greater diameter than the end of the wire 68 and also of greater depth than that end when the wire 65 occupies its normal position. In this way, a flexible and reliable contacting device is secured.

For the purpose of conducting current to each of the brass inserts 56, a binding screw 70 is employed to secure a conductor or wire 71 to the inner end of each insert, that is to say, within the hollow gear body. The use of the spring contact or wire 65 provides exceptionally good electrical contact as the pinion and corresponding gear wheel mesh and, moreover, the flexible mounting of the wire 65 permits the necessary movement thereof to avoid damage or permanent distortion.

The outer faces of all of the pinions are provided with suitable caps or disks 72 for closing the openings in the pinions, which thus present a substantially flat outer face.

It will be understood, without further description, that the preparation of the spur pinion 9 with a plurality of brass inserts and spring contact wires follows the same procedure as that set forth in connection with the helical pinion 7.

The structure of the helical demonstrating pinion 8 is shown in Fig. 3, which illustrates an outer ring or hollow cylinder 76 of bakelized micarta or other similar insulating material within which a supporting metallic ring 77 fits, while hollow wooden disks or annular members 78, in turn, fit within the ends of the steel ring 77. The pinion shaft 5 is rigidly positioned within the wooden rings 78, whereby the desired rotative movement of the demonstrating pinion 8 with the contact pinion 7 is effected.

A plurality of hollow teeth 79, 80, etc., are cast either singly or in sections and a plurality of partitions or transverse walls 81 are also cast into the teeth. A number of alined holes 82 are drilled in the face of each hollow tooth that corresponds to the contact face of the contact pinion 7, these holes being placed at substantially the mid-planes of the respective compartments, within which miniature low-voltage electric lights 84 are placed. Thus, the lighting of any one miniature lamp affords a visual indication through the holes 82, but the light is not shown elsewhere by reason of the partitions 81 between the lamps. Suitable insulated wires or conductors 85 extend from within the hollow pinion shaft 5 to the mounting receptacles 85ª of each lamp. For securing the metallic teeth to the body of the pinion, a plurality of flat-headed screws 83 extend through the teeth near the bases thereof into the metallic ring 77.

The helical demonstrating pinion 8 thus provides a plurality of compartments in each hollow tooth corresponding to the brass inserts or contact members 60 to 64, inclusive, in the corresponding face of each tooth of the helical contact pinion 7. By suitably interconnecting the brass inserts and electric lamps, as subsequently described in detail, it will be seen that, whenever, contact is effected between any brass insert and a tooth of the helical gear-wheel 3, the corresponding lamp may be lighted to afford a visual indication or demonstration of the tooth contact that is taking place between the meshing pinion and gear-wheel.

Without detailed illustration, it will be understood that a corresponding structure is provided in the demonstrating spur pinion 10, the teeth of which extend in the usual perpendicular relation to the end faces of the pinion. However, since the entire face of a spur gear tooth makes contact at substantially the same time, it follows that the partitions between the lamps 84 are not necessary in the hollow teeth of the demonstrating pinion 10, since all of the lamps in each tooth will light simultaneously.

Referring now to the electrical signal circuits in the pinion members, Fig. 9 has reference to the spur contact pinion 9 and the spur demonstrating pinion 10. The external electrical connections comprising conductors 52 and 39, which are respectively associated with the collector rings 41 and 37, are illustrated to show how the circuits for the various signal lamps are completed. The contact members or brass inserts in the faces of the sixteen teeth upon the spur contact pinion 9 are indicated by sets of reference characters from 101 to 180, inclusive, being arranged five to a tooth, as previously described. For the sake of clearness, the necessary conductors are not shown separately, but are grouped in a common bundle 86 within the contact pinion 9. These conductors extend through the hollow pinion shaft 6, as indicated by the wire bundle 87, and again branch out into a bundle 88, from which the individual wires extend to the corresponding electric lamps, in the demonstrating pinion 10.

The lamp corresponding to contact member 101 is numbered 201, and similar relations of numbers obtain throughout the diagram. It will be understood that the initially selected relative location of the contact member 101 and the corresponding lamp 201 will depend upon the particular point of view that the observer of the demonstrating apparatus is supposed to assume. In the present case, this position is in front of the gear shaft 2 or, in other words, to the rear of the structure as illustrated in Fig. 1. Under such conditions, the uppermost demonstrating tooth, which is most plainly to be seen in each case, provides the visual indication of the contact that is taking place between the teeth of the meshing pinion.

As previously stated, the contact members in the spur contact pinion 9 may be all connected in parallel relation, and the same statement holds true with respect to the sets of five lamps in each hollow tooth of the spur demonstrating pinion, the reason being that contact occurs along the entire face of each spur tooth of the meshing gear-wheels, and, consequently, a single lighting indication would be provided even though the contact members and electric lamps were separately wired. In the case of the spur pinions 9 and 10, therefore, sixteen conductors or wires are necessary to complete the connections between the two pinions.

The entire electrical circuit in Fig. 9 may be traced from the supply conductor 52 through collector ring 41, shaft 2, spur gear-wheel 4, the brass inserts in the face of the contacting tooth in the spur pinion 9, and the proper conductors to the corresponding lamps in the demonstrating pinion 10, whence circuit is completed through return conductor 89, collector ring 37 and carbon brush 36 to the other supply conductor 39.

In Fig. 10, a corresponding general arrangement of circuits for the helical pinions is provided, it being noted, however, that, since the tooth contact, in the case of helical gearing, progresses across the face of the gear tooth gradually instead of occurring instantaneously over the entire face of the gear tooth as in the case of spur gears, separate lighting circuits corresponding to each brass insert in the faces of the contact pinion 7 must be provided. Consequently, the brass inserts or contact members in the teeth of the contact pinion 7, indicated by sets of reference characters from 301 to 380, inclusive, are provided with separate conductors or wires that, for the sake of simplicity, are illustrated as forming a single bundle 90 that branches into bundle 91, which extends through the hollow pinion shaft 5 and terminates in another wire bundle 92. The individual wires lead from the bundle 92 to the respective signal lamps which are numbered, in part, from 401 to 480, inclusive, corresponding, respectively, to the contact members or brass inserts 301 to 380, inclusive. For example, as illustrated, insert 303 is connected to lamp 403. In this case, therefore, a total of eighty wires or conductors necessarily extend from the helical contact pinion 7 to the helical demonstrating pinion 8, whereby the lamps may be lighted in succession.

The entire electrical circuit in Fig. 10 may be traced as follows: from the supply conductor 52, through collector ring 41, gear shaft 2, helical gear-wheel 3, certain contact members or brass inserts of the helical contact pinion 7, dependent upon the particular teeth in contact, whence a circuit is continued through wire bundles 90, 91 and 92 to the corresponding electric lamps in the helical pinion 8, circuit being completed through return conductor 93, collector ring 35 and carbon brush 31 to the supply conductor 38.

The operation of the apparatus may be briefly set forth as follows. In the case of spur gearing, although two successive teeth are in mesh at certain periods, one complete tooth enters into contact at a time, so that the corresponding hollow tooth in the demonstrating pinion 10 will have all its lamps simultaneously lighted, and the teeth in the demonstrating pinion 10 will successively flash signals as the spur gear-wheel 4 and pinion 9 are rotated through the agency of the electric motor 14. On the other hand, the lighting of the electrical lamps in the helical demonstrating pinion 8 will occur successively and gradually so that, at one period of the tooth contact, all the lamps in one tooth will be lighted and, in addition, the last lamp in the preceding tooth that is about to become disengaged and the first lamp in the succeeding tooth that has just become engaged are also lighted. In this way, a smooth continuous contact between the teeth of helical gear-wheels is visually contrasted with the spasmodic vibratory contact between the teeth of spur gear-wheels. Furthermore, the time required for a complete tooth-meshing or contact is clearly indicated.

We do not wish to be restricted to the specific structural details, circuit connections or arrangement of parts herein set forth, as various modifications thereof may be made without departing from the spirit and scope of our invention. For example, the apparatus may be arranged to deliver audible, rather than visible, signals, as will be appreciated. We desire, therefore, that only such limitations shall be placed thereon as are indicated in the appended claims.

We claim as our invention:

1. The combination with a plurality of meshing gear-wheels, of means comprising electrical circuits for demonstrating the tooth contact of the gear-wheels.

2. The combination with a plurality of meshing gear-wheels, of means responsive to the tooth contact of the gear-wheels at different portions of the teeth for respectively establishing electric circuits.

3. The combination with a plurality of meshing gear-wheels, of an auxiliary gear-wheel rotatable with the others, and means for utilizing the auxiliary gear-wheel for demonstrating the tooth contact of the first-named gear-wheels.

4. The combination with a plurality of meshing gear-wheels, of means comprising a plurality of electrical signal elements for indicating the tooth contact of the gear-wheels.

5. The combination with a plurality of meshing gear-wheels, of means responsive to each tooth contact of the gear-wheels for successively energizing electrical signal elements.

6. The combination with a plurality of meshing gear-wheels, of an auxiliary gear-wheel out of mesh but rotatable with the others, and a plurality of signal means in the auxiliary gear-wheel for successively indicating the tooth contact of the meshing gear-wheels.

7. The combination with a plurality of meshing gear-wheels, of an auxiliary gear-wheel out of mesh but rotatable with the others, said auxiliary gear-wheel having hollow teeth, and a plurality of electric lights in said hollow teeth for successively indicating the tooth contact of the meshing gear-wheels.

8. The combination with a plurality of meshing gear-wheels, of an auxiliary gear-wheel, and means comprising a plurality of electric lights inside said auxiliary gear-wheel for successively indicating the contemporaneous tooth contacts of the first-named gear-wheels.

9. The combination with a plurality of meshing helical gear-wheels, of an auxiliary gear-wheel rotatable with the others, said auxiliary gear-wheel having hollow, transversely-partitioned teeth, and a plurality of electric lights in the several tooth compartments for successively indicating the tooth contact of the meshing gear-wheels.

10. The combination with a stand, of a plurality of operating shafts supported by said stand, a plurality of gear-wheels of different types secured to one of said shafts, a plurality of other gear-wheels mounted on other shafts and meshing with the first-named gear-wheels, a plurality of auxiliary gear-wheels rotatable with the others, and signal means disposed in said auxiliary gear-wheels for contrasting the tooth contacts of the sets of meshing gear-wheels.

11. The combination with a stand, of a plurality of operating shafts supported by said stand, a plurality of gear-wheels of different types secured to one of said shafts, a plurality of other gear-wheels mounted on other shafts and meshing with the first-named gear-wheels, a plurality of auxiliary gear-wheels rotatable with the others and having hollow teeth, a plurality of electric lights in said teeth, and means responsive to the tooth contact of the meshing gear-wheels for establishing electric circuits through said lights.

12. The combination with a gear body, of a hollow tooth secured thereto, and an electric light in said tooth.

13. The combination with a hollow cylindrical member, of a hollow gear-tooth secured thereto and divided into compartments, and an electric light in each compartment.

14. The combination with an annular gear body, of a plurality of hollow teeth secured thereto, and an electric light in each tooth, the teeth being provided with openings opposite the lights.

15. The combination with a gear body of non-conducting material, of a plurality of teeth cut therein, and a plurality of conducting members inserted in and conforming to the shape of said teeth.

16. The combination with an annular gear body, of a plurality of teeth cut therein, a plurality of metallic inserts located in one face of each tooth, and a plurality of conductors connected to the respective inserts.

17. The combination with a gear body, of a plurality of teeth cut therein, a metallic insert located in a tooth face and having a facial recess, and a flexible conducting member disposed in said recess.

18. The combination with a gear body, of a plurality of teeth cut therein, a metallic insert located in a tooth face and having a facial recess, and a serrated wire located in said recess and having only one fixed end.

19. The combination with a shaft, of two gear-wheels secured thereto, one having a hollow tooth, a conducting member inserted in a tooth of the other gear-wheel, electric signal means located in said hollow tooth, and means for including said conducting member and said signal means in an electric circuit.

20. The combination with a hollow shaft, of two gear-wheels secured thereto, one having hollow teeth, a plurality of metallic inserts located in a face of each tooth of the other gear-wheel, a plurality of electric lights disposed in said hollow teeth, and a plurality of conductors passing through said shaft for interconnecting certain inserts and lights.

21. The combination with a shaft, of two gear-wheels secured thereto, one having hollow teeth, a conducting member inserted in a face of each tooth of the other gear-wheel, electric signal means located in each hollow tooth, a metallic gear-wheel meshing with said other gear-wheel, and a plurality of supply conductors respectively connected to said signal means and to said metallic gear-wheel.

22. The combination with a plurality of meshing gear-wheels, of means remote therefrom for indicating the time required by a gear tooth in making contact over the entire face of the tooth.

23. The combination with a plurality of meshing gear-wheels, of auxiliary means for electrically indicating the elapsed meshing period for a complete gear-tooth contact.

24. The combination with a plurality of meshing gear-wheels, of means operative during each complete gear-tooth contact for indicating the successive teeth-meshing periods.

25. The combination with a gear tooth, of a resilient conducting member inserted in the tooth face.

In testimony whereof, we have hereunto subscribed our names this 4th day of Oct., 1919.

GEORGE M. EATON.
HOWARD H. JOHNSTON.